US011862895B2

(12) United States Patent
Wang

(10) Patent No.: US 11,862,895 B2
(45) Date of Patent: Jan. 2, 2024

(54) ELECTRICAL PLUG

(71) Applicant: EmCom Technology Inc., Taipei (TW)

(72) Inventor: Chu-Li Wang, Taipei (TW)

(73) Assignee: EMCOM TECHNOLOGY INC., Taipei (TW)

( * ) Notice: Subject to any disclaimer, the term of this patent is extended or adjusted under 35 U.S.C. 154(b) by 103 days.

(21) Appl. No.: 17/479,608

(22) Filed: Sep. 20, 2021

(65) Prior Publication Data

US 2022/0131315 A1 Apr. 28, 2022

(30) Foreign Application Priority Data

Oct. 27, 2020 (TW) ................................ 109137285

(51) Int. Cl.
*H01R 13/627* (2006.01)
*H01R 13/502* (2006.01)

(52) U.S. Cl.
CPC ....... *H01R 13/6272* (2013.01); *H01R 13/502* (2013.01)

(58) Field of Classification Search
CPC . H01R 23/025; H01R 13/6272; H01R 13/502
USPC .................................................. 439/418, 352
See application file for complete search history.

(56) References Cited

U.S. PATENT DOCUMENTS

| | | | | |
|---|---|---|---|---|
| 6,116,943 A * | 9/2000 | Ferrill | H01R 24/64 439/418 |
| 7,001,204 B1 * | 2/2006 | Lin | H01R 4/2433 439/418 |
| 9,799,982 B1 * | 10/2017 | Lin | H01R 13/506 |

* cited by examiner

*Primary Examiner* — Gary F Paumen
(74) *Attorney, Agent, or Firm* — Muncy, Geissler, Olds & Lowe P.C.

(57) ABSTRACT

An electrical plug is provided. The electrical plug includes a body and a retention device. The body includes a first casing and a second casing. The second casing is pivotally connected to one side of the first casing and can rotate to make one of its ends away from one end of the first casing. The first casing and the second casing form a body inner space together. At least a portion of the retention device can rotate along the same direction as the second casing rotates.

6 Claims, 5 Drawing Sheets

ELECTRICAL PLUG

BACKGROUND

Field of the Invention

The present invention generally relates to an electrical plug. More particularly, the present invention relates to an electrical plug connected to a signal transmitting cable bearing electronic signal.

Related Art

Signal transmitting cables such as telephone cables, fiber optic cables, Ethernet cables, etc. usually achieve electrical connection by inserting the electrical plug with which the cables are coupled to sockets on walls or on other corresponding devices. Ordinary signal transmitting cables are coupled with specific electrical plugs for the convenience of the consumers when they purchase or use such devices.

However, under certain circumstances, technicians have to couple electrical plugs with signal transmitting cables in accordance with user requirement in situ. As shown in the embodiments in FIGS. 1A and 1B, a conventional electrical plug 90 includes a latch 20 and a body 10 having lower casing 11 and upper casing 12. Technicians would tilt the upper casing 12 when they make the wire connection. The work is inconvenient since the tilted angle is limited due to the fact that the shape of conventional latch 20 is fixed. Even when the terminal 21 has an upward tilting design, the extent it can benefit the increase of the tilted angle of the upper casing 12 is limited. Therefore, conventional electrical plugs are still improvable.

SUMMARY OF THE INVENTION

The object of the present invention is to provide an electrical plug which is more convenient to use.

The electrical plug includes a body and a retention device. The body includes a first casing and a second casing. The second casing is pivotally connected to one side of the first casing and is capable of rotating to make its one end away from one end of the first casing. The first casing and the second casing form a body inner space together. The retention device connects to the end of the first casing opposite to the second casing. At least a portion of the retention device is capable of rotating along the same direction as the second casing rotates.

In one embodiment, the electrical plug is capable of electrically connecting to and fixing to a corresponding socket. The first casing includes a first A end and a first B end disposed on opposite ends, wherein the body can be inserted into the socket with the first A end facing the socket. The second casing is capable of rotating to make one end of the second casing away from the first B end. The retention device is capable of fixing the body to the socket when the body is inserted into the socket.

In one embodiment, the retention device is capable of rotating to increase the angle by which the second casing is capable of rotating when the second casing rotates to make one end of the second casing away from the first B end.

In one embodiment, the second casing includes a second A end and a second B end disposed on opposite ends. The second casing is disposed on one side of the first casing with the second A end pivotally connected to the first casing. The second casing is capable of rotating with the second A end as a pivot to make the second B end selectively adjacent to or away from the first B end.

In one embodiment, the distance between the second A end and the second B end is ½ to ⅔ of the distance between the first A end and the first B end.

In one embodiment, the distance between the vertical projection of the second A end on the first casing and the second B end is ½ to ⅔ of the distance between the first A end and the first B end.

In one embodiment, the retention device includes a latch and a deformation part. The latch includes a connecting end and an extending end disposed on opposite ends. The connecting end connects to the first A end. The extending end extends toward the second A end. The deformation part is disposed on the extending end. The deformation part is capable of rotating along the same direction as the second casing rotates.

In one embodiment, the deformation part includes a bending piece pivotally connected to the extending end. The bending piece is capable of rotating along the same direction as the second casing rotates.

In one embodiment, a concave is disposed on one side of the second casing facing the retention device. At least a portion of the retention device is capable of being accommodated in the concave when the extending end moves toward the first casing.

DETAILED DESCRIPTION

The electrical plug of the present invention is capable of carrying electronic or light signal. More particularly, as shown in the embodiments in FIGS. 2A and 2B, one end of the electrical plug 900 is coupled to the signal cable 800, wherein the electrical plug 900 is capable of electrically connecting to and fixing to corresponding sockets (not shown).

Figure 1A:
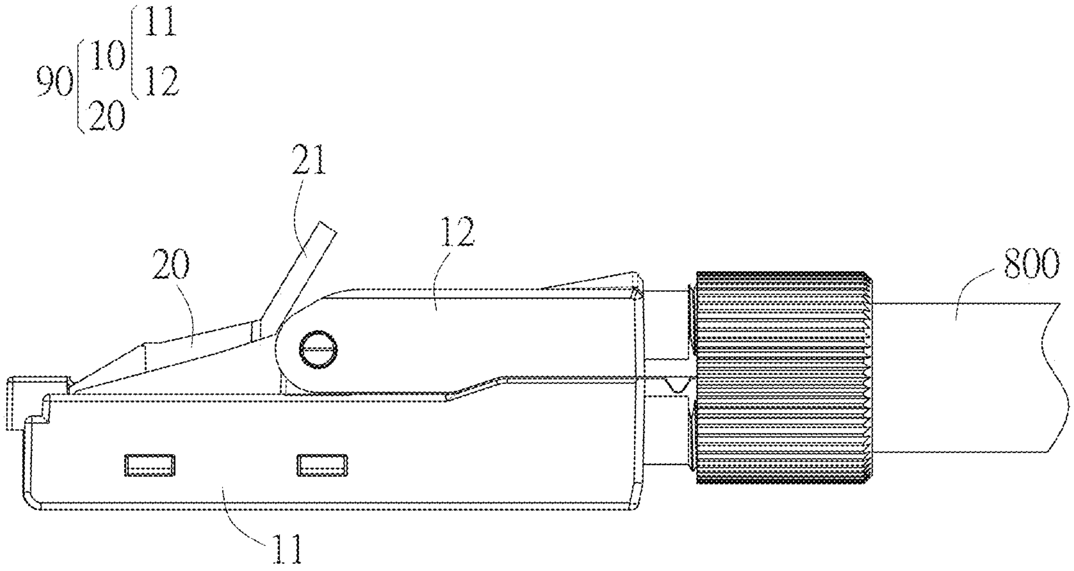
FIG. 1A (PRIOR ART)
FIGS. 1A and 1B are schematic diagrams of prior art.
Figure 1B:
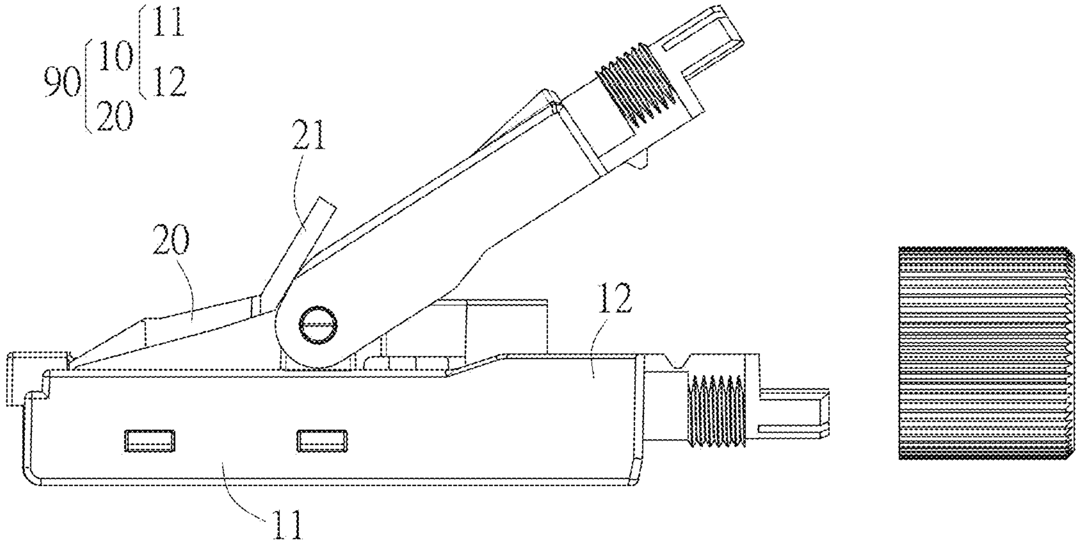
FIG. 1B (PRIOR ART)
Figure 2A:
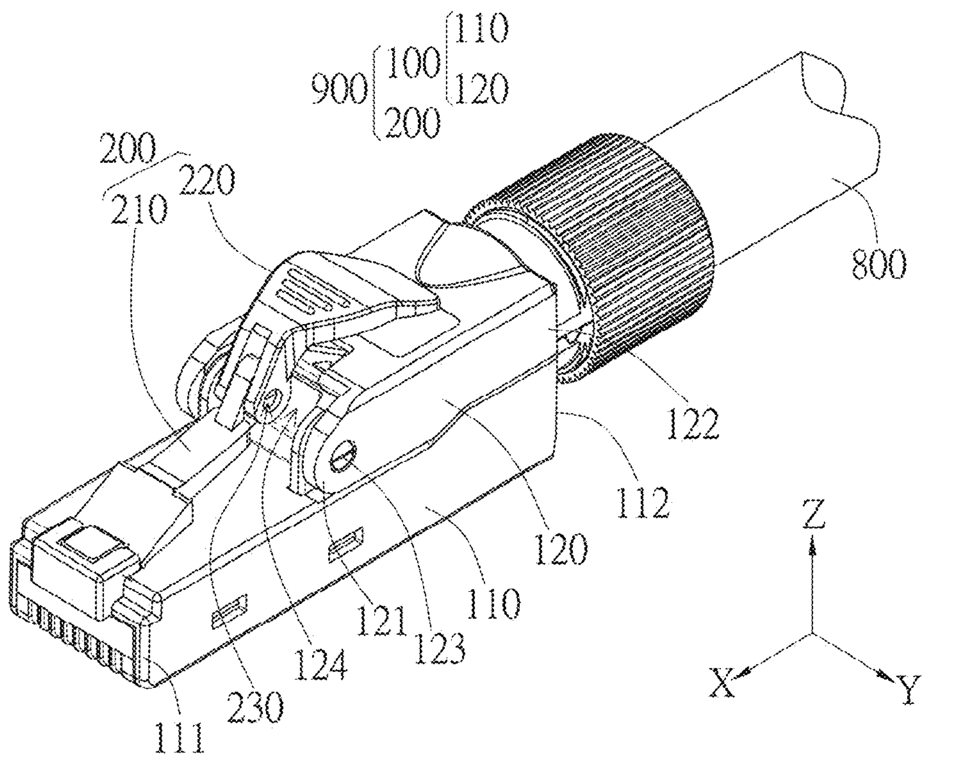
FIGS. 2A and 2B are schematic diagrams of an embodiment of an electrical plug of the present invention.
Figure 2B:
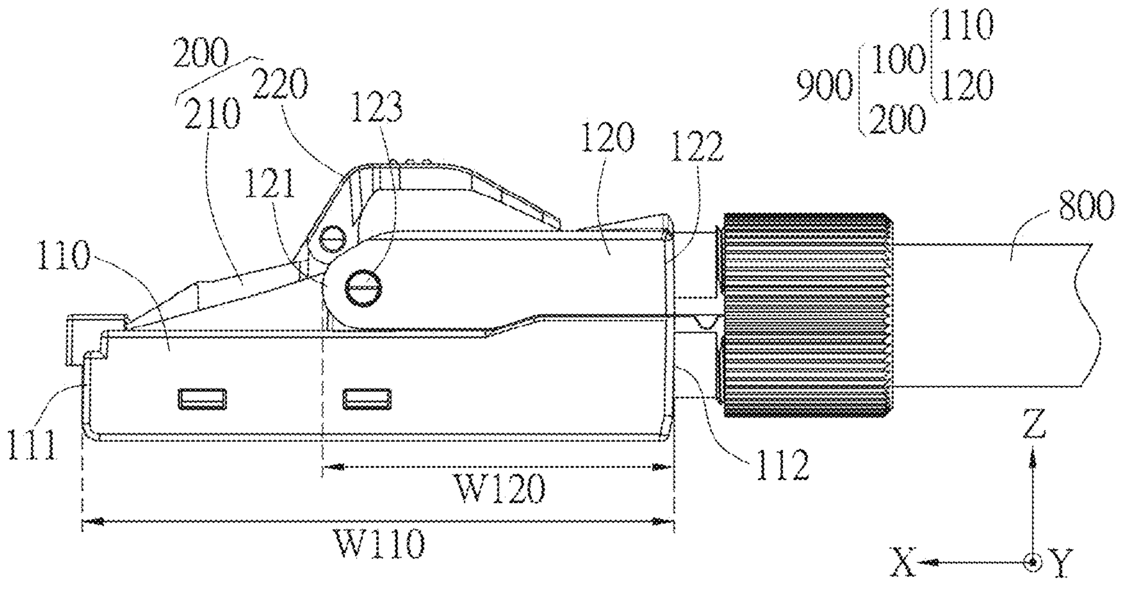

As shown in the embodiments in FIGS. 2A and 2B, the electrical plug 900 includes a body 100 and a retention device 200. The body 100 includes a first casing 110 and a second casing 120. The second casing 120 is pivotally connected, e.g. by a pivot 123, to one side of the first casing 110 and is capable of rotating to make one of its ends away from one end of the first casing 110. The first casing 110 and the second casing 120 can form a body inner space together to accommodate electronic circuits and elements, etc. The retention device 200 connects to the end of the first casing 110 opposite to the second casing 120. At least a portion of the retention device 200 is capable of rotating along the same direction as the second casing 120 rotates.

Specifically, as shown in the embodiments in FIGS. 2A and 2B, the first casing 110 includes a first A end 111 and a first B end 112 disposed on opposite ends. The body 100 is capable of inserting into a socket with the first A end 111 facing the socket. The second casing 120 is capable of rotating to make one end of the second casing 120 away from the first B end 112. The retention device 200 is capable of fixing the body 100 to the socket when the body 100 is inserted into the socket. Fixing the body 100 to a socket by the retention device 200 is not described since it is a well-known technique.

More particularly, as shown in the embodiments in FIGS. 2A to 3B, the second casing 120 includes a second A end 121 and a second B end 122 disposed on opposite ends. The second casing 120 is disposed in one side of the first casing 110 with the second A end 121 pivotally connected to the first casing 110. The second casing 120 is capable of rotating with the second A end 121 as a pivot to make the second B end 122 selectively adjacent to or away from the first B end 112.

Viewing it from a different perspective, as shown in the embodiments in FIGS. 2A to 3B, the first casing 110 and the second casing 120 are long objects extend along the X-axis and respectively have a top opening and a bottom opening. The second casing 120 is pivotally connected to the upper edge of the first casing 110 by the second A end 121, hence the second B end 122 is capable of rotating along a plane parallel to the X-Z plane. As shown in the embodiments in FIGS. 2A and 2B, the second casing 120 rotates to make the second B end 122 adjacent to the first B end 112, i.e. the first casing 110 and the second casing 120 form a body inner space together.

Figure 3A:
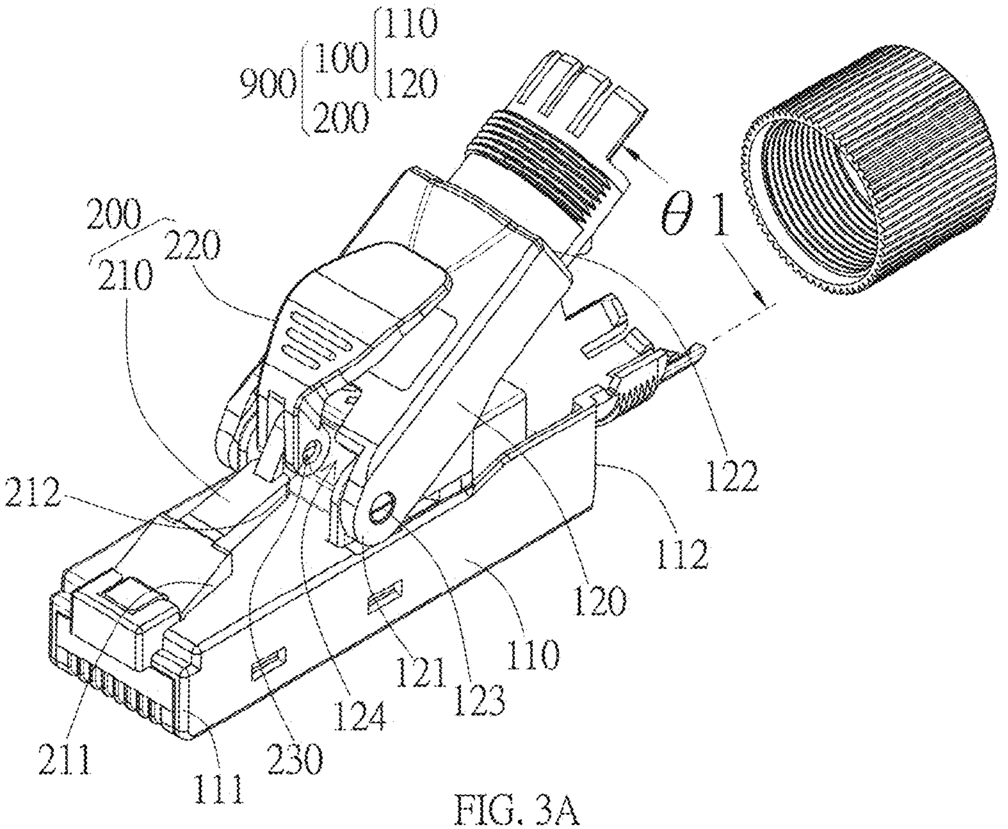
FIGS. 3A and 3B are schematic diagrams of an embodiment of an electrical plug of the present invention wherein the second casing is tilted at an angle.
Figure 3B:
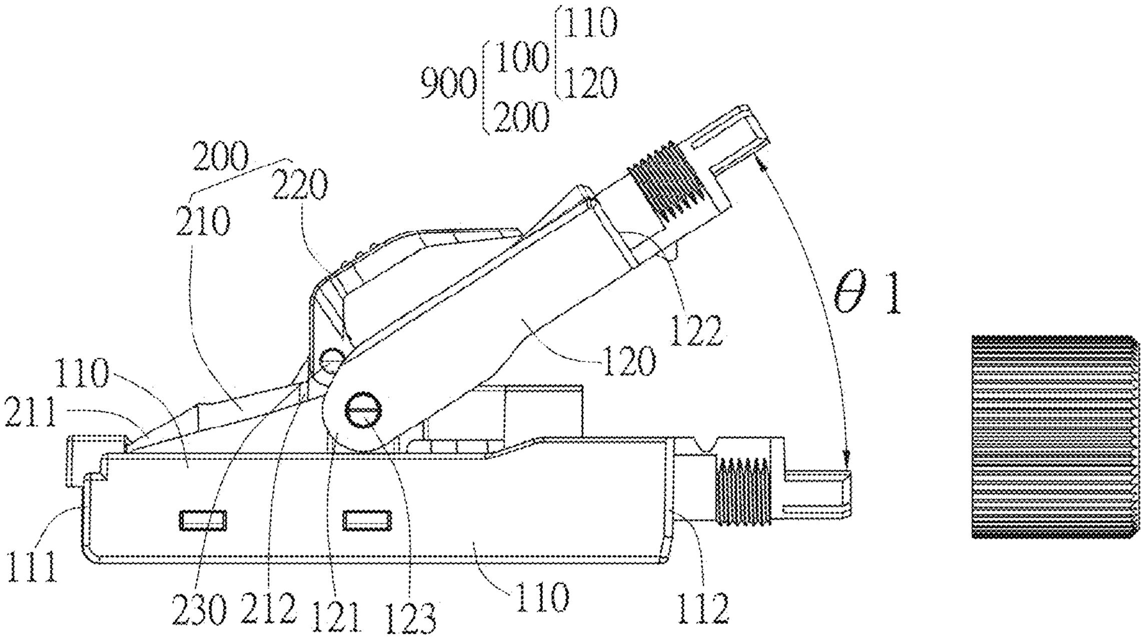
Figure 4A:
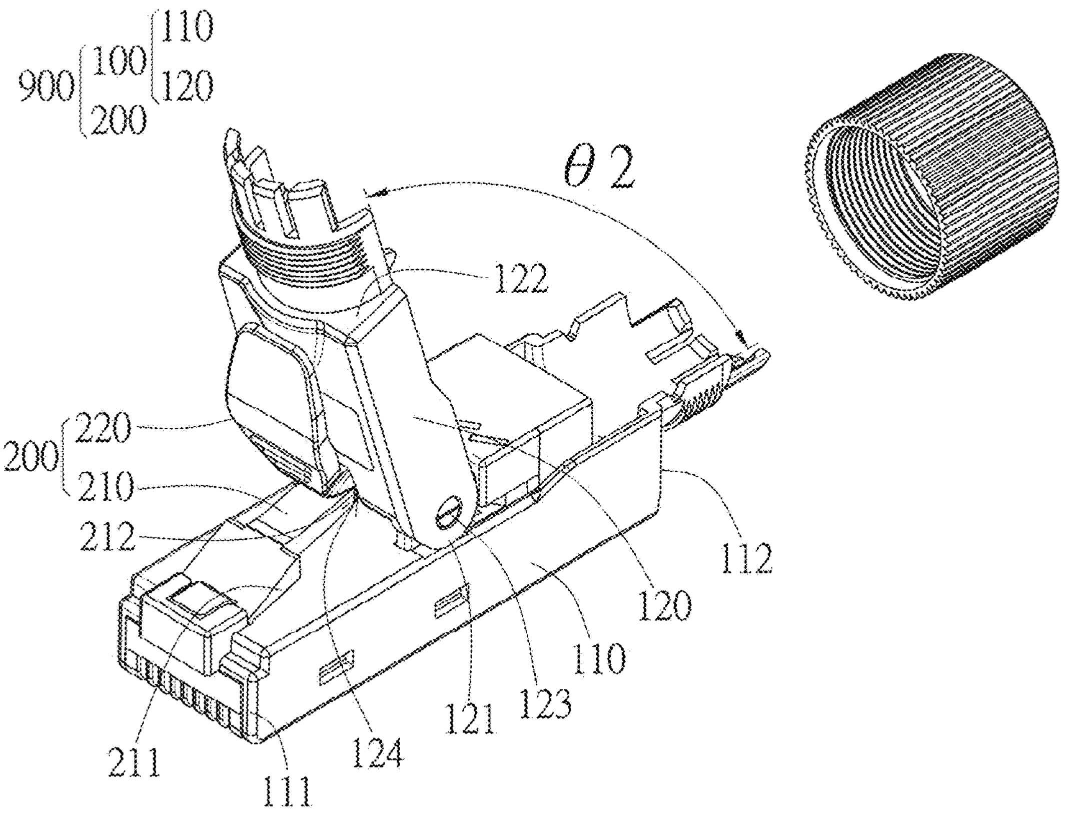
FIGS. 4A and 4B are schematic diagrams of an embodiment of an electrical plug of the present invention wherein the second casing is tilted at another angle.
Figure 4B:
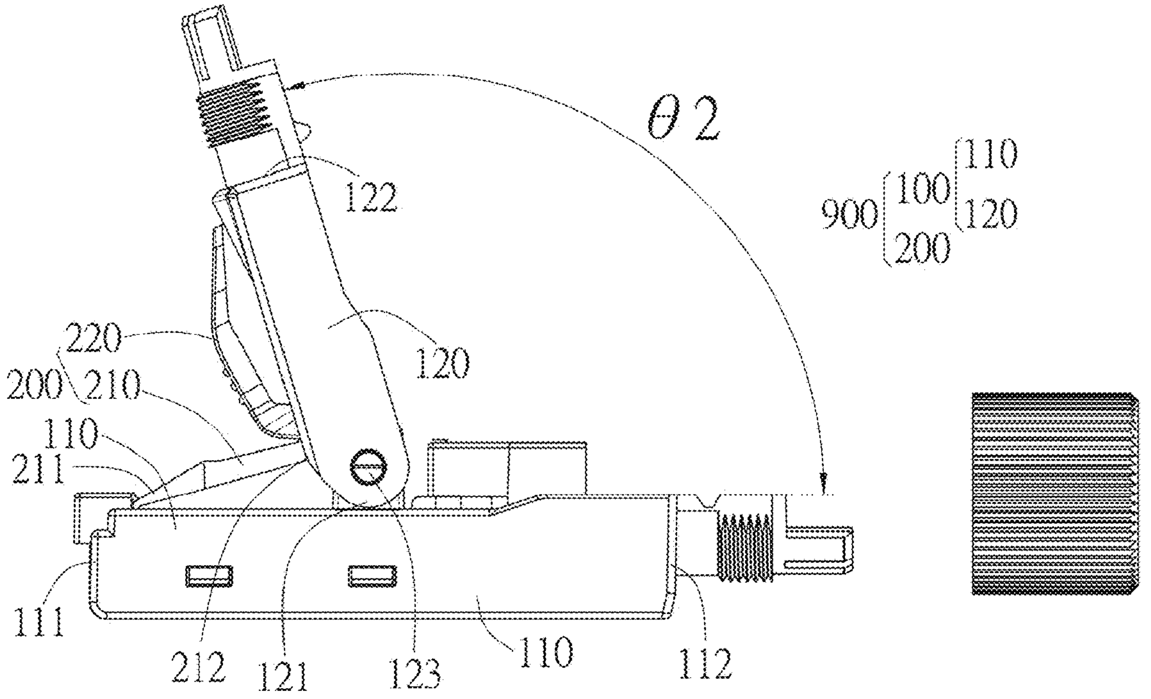

On the other hand, as shown in the embodiments in FIGS. 3A and 3B, the second casing 120 rotates to make the second B end 122 away from the first B end 112, i.e. the first casing 110 and the second casing 120 are opened with an angle θ1 to expose the interior of the body 100. After then, as shown in the embodiments in FIGS. 4A and 4B, while the second casing 120 rotates further, since at least a portion of the retention device 200 is capable of rotating along the same direction as the second casing 120 rotates, the second B end 122 can continue to move away from the first B end 112 and makes the first casing 110 and the second casing 120 be opened with an angle θ2.

More particularly, as shown in the embodiments in FIGS. 3A to 4B, the retention device 200 includes a latch 210 and a deformation part 220. The latch 210 includes a connecting end 211 and an extending end 212 disposed on opposite ends. The connecting end 211 connects to the first A end 111. The extending end 212 extends toward the second A end 121. The deformation part 220 is disposed on the extending end 212, which is the end of the latch 210 extending toward the second A end 121. The deformation part 220 is capable of rotating along the same direction as the second casing 120 rotates. In this embodiment, the deformation part 220 includes a bending piece pivotally connected to the extending end 212. The bending piece is capable of rotating along the same direction as the second casing 120 rotates. The deformation part 220 is pivotally connected to the extending end 212 by pivots 230, for example.

Accordingly, when the second casing 120 rotates to make one end of the second casing 120 away from the first B end 112, the retention device 200 can rotate to increase the angle the second casing 120 is capable of rotating, exposing the interior of the body 100 to a greater extent. Therefore, a user can accomplish work (such as wire matching) inside the body 100 more conveniently and hence the electrical plug is more convenient to use. For a better interworking between the retention device 200 and the second casing 120 to increase the angle the second casing 120 is capable of rotating, for example, the distance between the second A end 121 and the second B end 122 is ½ to ⅔ of the distance between the first A end 111 and the first B end 112. In other words, the length of the second casing 120 is about ½ to ⅔ of the length of the first casing 110. Viewing it from a different perspective, the distance between the vertical projection of the second A end 121 on the first casing 110 and the second B end 112 is ½ to ⅔ of the distance between the first A end 111 and the first B end 112.

Figure 5A:
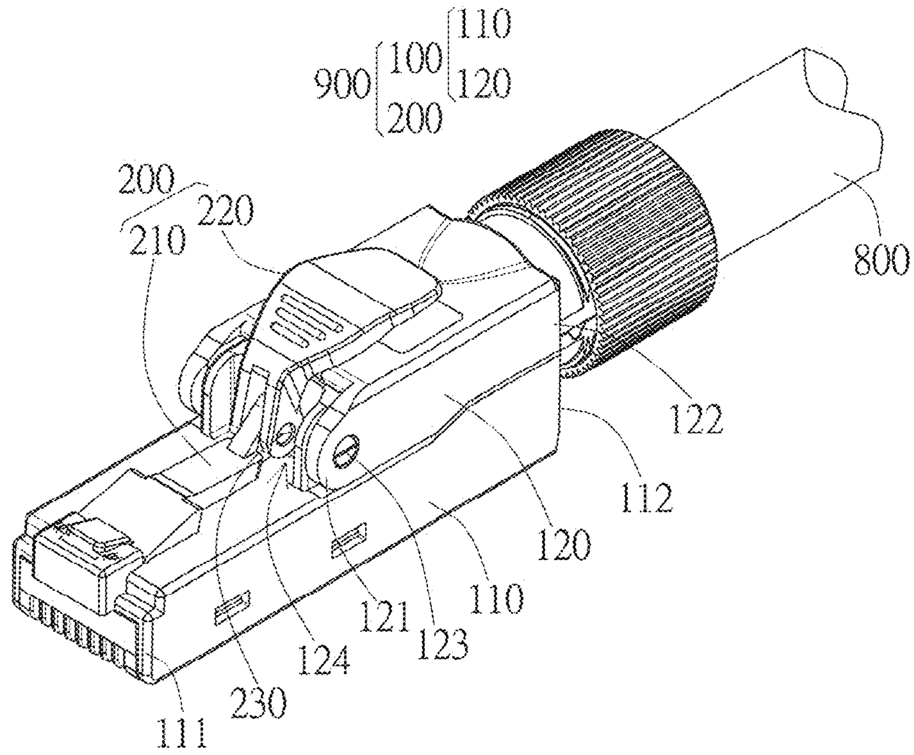
FIGS. 5A and 5B are schematic diagrams of an embodiment of an electrical plug of the present invention wherein at least a portion of the retention device is accommodated in the concave.
Figure 5B:
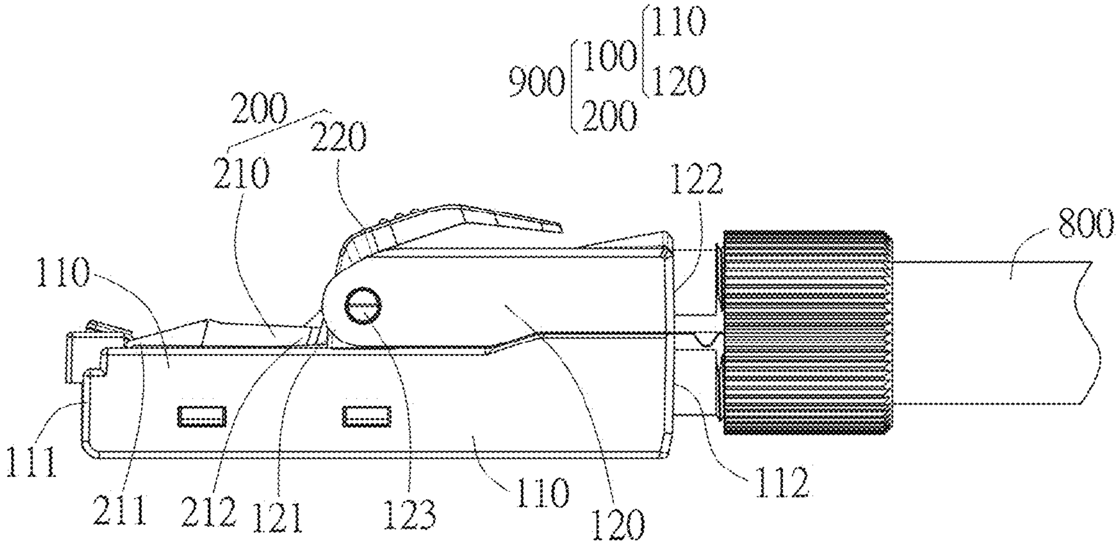

On the other hand, as shown in the embodiments in FIG. 5A, a concave 124 is disposed on one side of the second casing 120 facing the retention device 200. As described above, the retention device 200 is capable of fixing the body 100 to the socket when the body 100 is inserted into the socket. To release the body 100 from the socket, as shown in the embodiments in FIGS. 5A and 5B, the user can press down on the retention device 200 and makes the latch 210 close to the first casing 110, i.e. makes the extending end 212 move toward the first casing 110. At this time, at least a portion of the retention device 200 is capable of being accommodated in the concave 124. In other words, the concave 124 may reduce the limitation set by the second casing 120 on the retention device 200 when it is pressed down, to makes the latch 210 closer to the first casing 110.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An electrical plug capable of electrically connecting to and fixing to a corresponding socket, comprising:

a body, including:

a first casing, wherein the first casing includes a first A end and a first B end disposed on opposite ends, wherein the body is capable of being inserted into the socket with the first A end facing the socket;

a second casing pivotally connected to one side of the first casing, wherein the second casing is capable of rotating to make one end of the second casing away from one end of the first casing, wherein the first casing and the second casing form a body inner space together, wherein the second casing is capable of rotating to make one end of the second casing away from the first B end;

a retention device connecting to one end of the first casing opposite to the second casing, wherein at least a portion of the retention device is capable of rotating along the same direction as the second casing rotates, wherein the retention device is capable of fixing the body to the socket when the body is inserted into the socket, wherein the second casing includes a second A end and a second B end disposed on opposite ends;

a latch including a connecting end and an extending end disposed on opposite ends, wherein the connecting end connects to the first A end, wherein the extending end extends toward the second A end; and a deformation part disposed on the extending end, wherein the deformation part is pivotally connected to the extending end and is capable of rotating along the same direction as the second casing rotates.

2. The electrical plug according to claim 1, wherein:

the retention device is capable of rotating to increase the angle by which the second casing is capable of rotating when the second casing rotates to make one end of the second casing away from the first B end.

3. The electrical plug according to claim 1, wherein the second casing is disposed on one side of the first casing with the second A end pivotally connected to the first casing, wherein the second casing is capable of rotating with the second A end as a pivot to make the second B end selectively adjacent to or away from the first B end.

4. The electrical plug according to claim 1, wherein the distance between the second A end and the second B end is ½ to ⅔ of the distance between the first A end and the first B end.

5. The electrical plug according to claim 1, wherein the distance between the vertical projection of the second A end on the first casing and the second B end is ½ to ⅔ of the distance between the first A end and the first B end.

6. The electrical plug according to claim 1, wherein a concave is disposed on one side of the second casing facing the retention device, wherein at least a portion of the retention device is capable of being accommodated in the concave when the extending end moves toward the first casing.

* * * * *